UNITED STATES PATENT OFFICE.

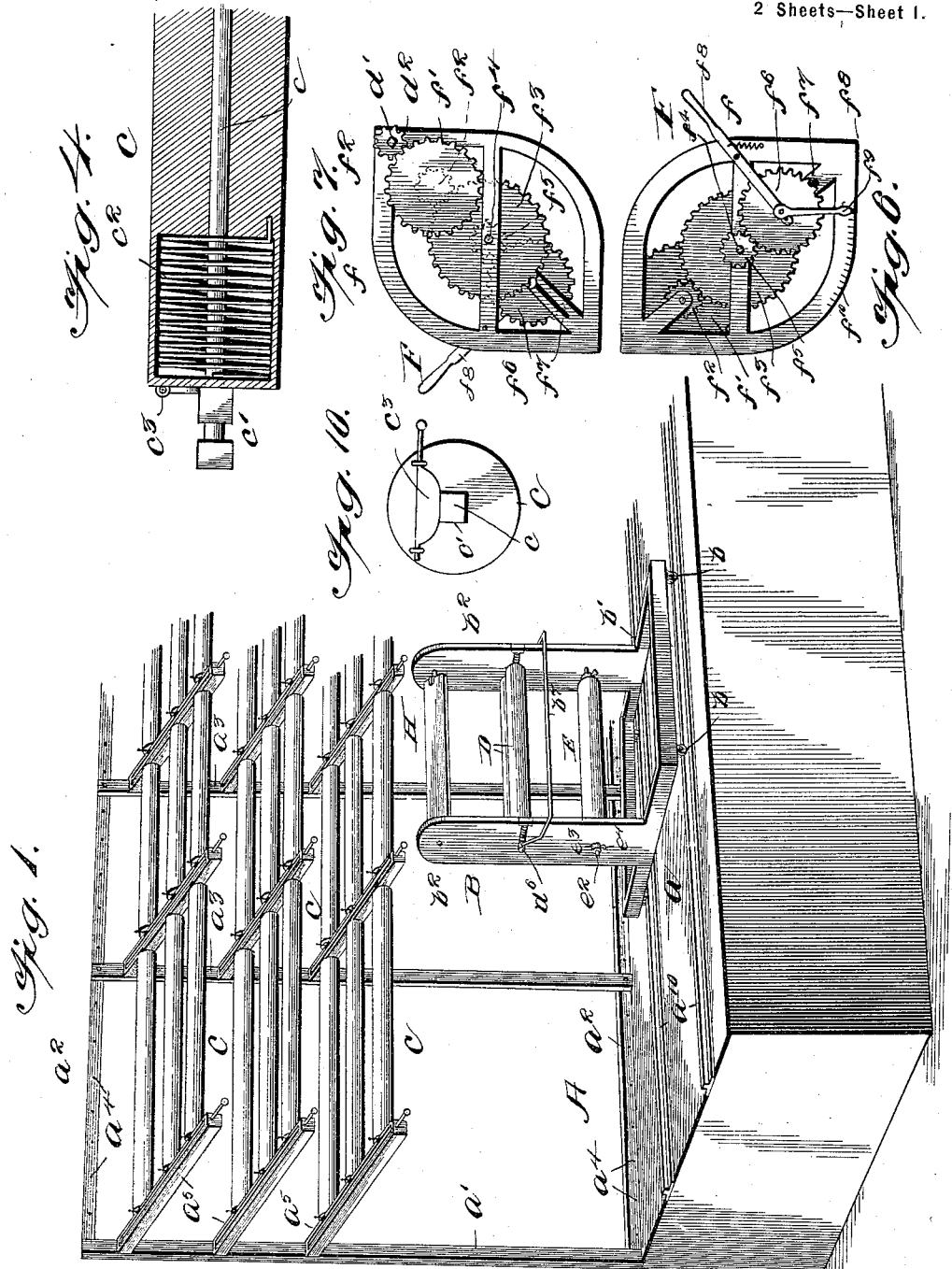

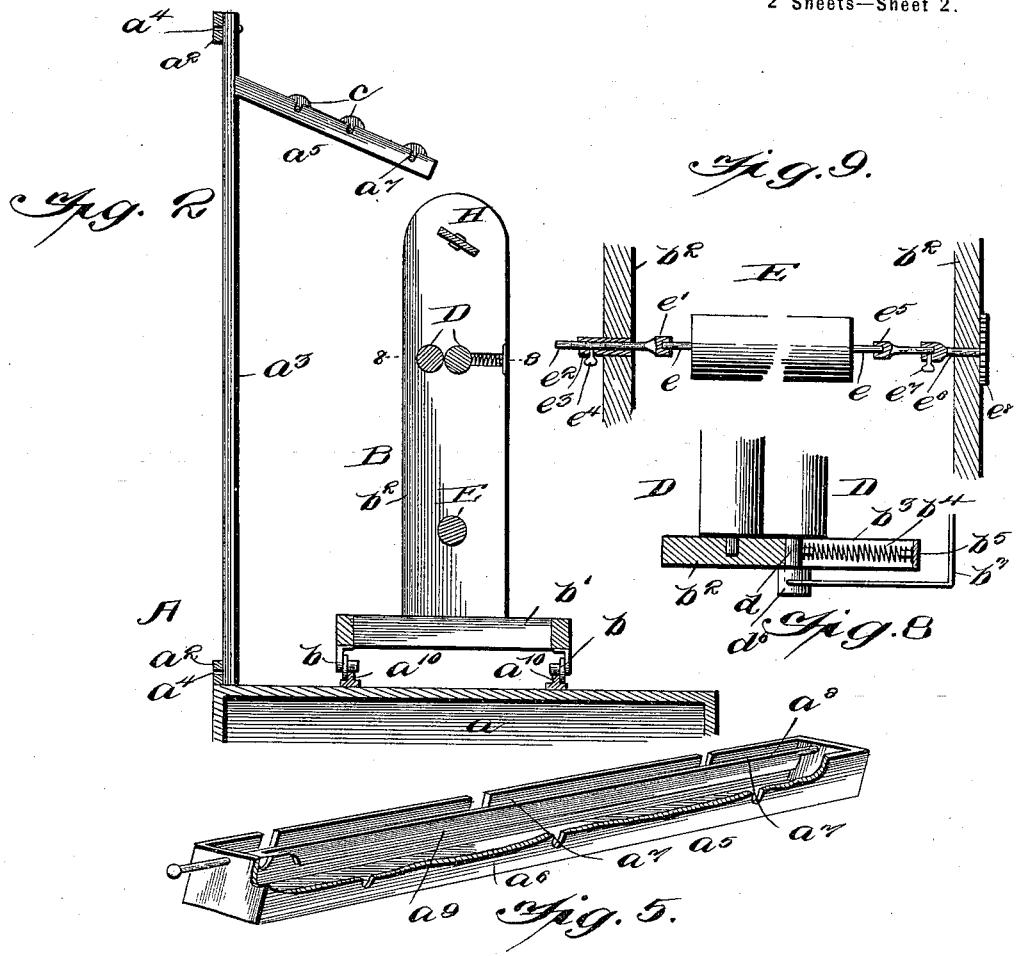
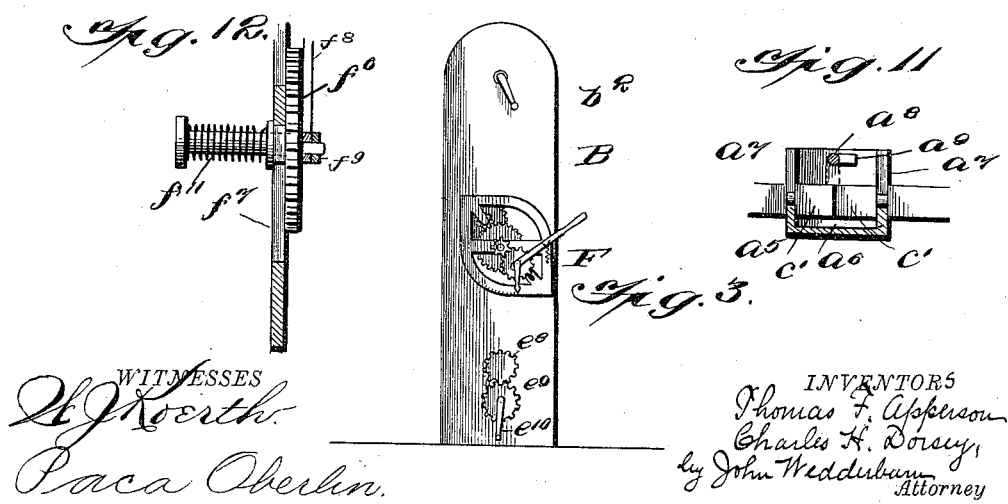

THOMAS F. APPERSON AND CHARLES H. DORSEY, OF POETRY, TEXAS.

ROLLER-SHELVING AND CLOTH-MEASURER COMBINED.

SPECIFICATION forming part of Letters Patent No. 610,510, dated September 6, 1898.

Application filed December 7, 1896. Serial No. 614,806. (No model.)

*To all whom it may concern:*

Be it known that we, THOMAS F. APPERSON and CHARLES H. DORSEY, citizens of the United States, residing at Poetry, in the county of Kaufman and State of Texas, have invented certain new and useful Improvements in Roller-Shelving and Cloth-Measurer Combined; and we do hereby declare the following to be a full, clear, and exact description of the invention, such as will enable others skilled in the art to which it appertains to make and use the same.

This invention relates to improvements in store-fixtures, and has more particular relation to cloth bolting and measuring devices.

The invention consists of certain novel constructions, combinations, and arrangements of parts, all of which will be hereinafter more particularly set forth and claimed.

In the accompanying drawings, forming a part of this specification, Figure 1 represents a perspective view, partly broken away, of the fixture embodying our invention. Fig. 2 represents a central vertical section through our said improvement on the line of the measuring-roller. Fig. 3 represents an enlarged detail end elevation of the end of the auxiliary frame carrying the operating-gear and registering mechanism. Fig. 4 represents an enlarged detail vertical section through one end of one of the spring-rollers. Fig. 5 represents an enlarged perspective view of one of the roller-supporting arms. Fig. 6 represents an enlarged front elevation of the gear-supporting casting and registering-gears. Fig. 7 represents a rear elevation of the same. Fig. 8 represents a horizontal section, partly broken away, through the auxiliary frame on the line of the measuring-rollers. Fig. 9 represents a central vertical section through said frame on the line of the winding-roller. Fig. 10 represents an enlarged detail end elevation of the end of one of the spring-rollers. Fig. 11 represents a central vertical transverse section through one of the supporting-arms and the ends of the two spring-rollers applied thereto; and Fig. 12 represents a detail central vertical section through the gear-supporting casting, illustrating the spring for returning the supporting-arm to its normal position.

A in the drawings represents the main frame; B, the auxiliary frame; C C, the cloth-holding rollers; D D, the measuring-rollers; E, the winding-roller, and F the registering device. Said main frame A may be of any desired material and construction and comprises a base $a$ and vertical end standards $a'$, horizontal bars $a^2\ a^2$, connecting the upper and lower ends of said standards, and adjustable bracket-supporting bars $a^3$. The said horizontal bars $a^2\ a^2$ are provided with a plurality of spaced apertures $a^4$, by means of which said bars $a^3$ may be adjusted thereon by a suitable pin connection, so as to accommodate the varying lengths of cloth. The roller-supporting brackets $a^5$ are mounted upon the end standards $a'$ and the said bars $a^3$, and each comprises grooved notched bars $a^6\ a^7$, adapted to receive the journaled ends of the rollers C. A pivoted rod $a^8$ is mounted between the sections $a^6\ a^7$ of each bracket and is provided with a laterally-projecting wing $a^9$. A suitable handle is mounted upon said rod $a^8$, so that the wing $a^9$ may be turned down firmly against the journaled end of the roller, if so desired. (See Figs. 5 and 11.) Each of said rollers C is provided with an axle $c$, that passes through the center of the same, said axle at one end being angular, as at $c'$, so that when the wing $a^9$ is turned down against said angular portion the axle will be prevented from rotating. A coiled spring $c^2$ is mounted in the roller and has one end connected to said axle $c$ and the other to said roller, so that when the said axle is rotated the spring is put under tension. A pivoted rod $c^3$, provided with a locking-wing similar to the rod $a^8$, is mounted upon the end of the roller, so as to be capable of being turned to bring the wing into contact with the angular portion of the shaft to prevent the turning of the shaft in said rollers.

By the above-described construction cloth wound upon the roller C may either be entirely withdrawn from the same or the rollers may be so set as to permit only a very small portion of the cloth to be withdrawn and to immediately rewind said cloth when the pressure upon the same is relaxed. When it is desired to altogether remove the cloth from the roller, the pivoted rod $c^3$ is turned so as to prevent the rotation of the axle or shaft in the roller and the rod $a^8$ turned so as to permit the rotation of the journal in the supporting-bracket. The cloth may now be freely unwound from the roller without any interference. When it is desirable to set the roller so that any cloth pulled therefrom will be instantly rewound upon relaxation of the pressure, the rod $c^3$ is rotated so as to carry its wing out of contact with the shaft $c$ and the rod $a^8$ is rotated so as to bring its wing into contact with the angular shaft. If the cloth be now pulled from the roller C, the rotation of said roller will wind the spring $c^2$, and thus when the cloth is released it will be immediately rewound upon the roller because of the tension of the spring. The rollers are normally left in this latter position so that customers may readily pull a portion of the cloth from the roller to examine it, said cloth being immediately rewound upon being released.

The said base $a$ is provided upon its upper surface with spaced rails $a^{10}$, adapted to receive the wheels $b$, mounted upon the under side of the auxiliary frame B, so that said frame may be slid along over the frame A to any point upon the same. This frame B comprises a base-plate $b'$ and vertical standards $b^2$ $b^2$, arranged at the opposite ends of the same. The measuring-rollers D D have their journaled ends mounted in standards $b^2$, so as to rotate freely within the same. The forward one of rollers D has its respective journaled ends $d\ d$ mounted in a horizontal slot $b^3$, formed in the respective standard $b^2$. It will thus be observed that the forward roller is capable of movement toward or away from the rear roller to permit the insertion of any thickness of cloth between the rollers. The forward roller is held normally into contact with the rear roller by coiled springs $b^4$, mounted in the opposite slots $b^3$ and bearing against the journaled ends $d$ of the forward roller. The rear ends of the coiled springs bear against suitable plates $b^5$, secured to the edges of the standard $b^2$ over the open ends of the slots. The apertured journaled ends $d$ are each provided with an arm $d^6$, loosely mounted thereon, said arms projecting forward and being connected with the front edges of the forward standard $b^2$ by a cross-bar $b^7$. By this construction the front roller D may be drawn away from the rear roller to permit the insertion of the end of the cloth between said rollers by simply grasping the cross-bar $b^7$ and pulling out upon the same against the tension of the coiled springs $b^4$. When the said cross-bar $b^7$ is released, the spring returns the front roller to its normal position and clamps the cloth firmly between said rollers. The movement of the cloth will now cause the rollers to revolve and indicate the amount passing between the same upon the registering device F. This device comprises a supporting-casting $f$, in one end of which the journaled end $d'$ of the rear roller D is mounted. Said journal is provided with a spur-gear $d^2$, that meshes with a large gear-wheel $f'$, journaled upon the said casting $f$. This gear-wheel $f'$ is in turn provided with a spur-gear $f^2$, which meshes with the large gear-wheel $f^3$, also journaled upon said casting $f$ by means of a shaft $f^4$. The end of the shaft $f^4$ upon the opposite side of the casting from the wheel $f^3$ is provided with a spur-gear $f^5$, that meshes with a gear-wheel $f^6$, movably mounted in a slotted arm $f^7$ of the casting $f$. A lever $f^8$ is pivoted upon casting $f$ and connected to said wheel $f^6$, whereby the latter may be moved out of or into mesh with the wheel $f^5$ at will. Said lever $f^8$ is connected to the casting $f$ by a suitable spring, whereby said wheel $f^6$ is normally held into mesh with the wheel $f^5$. The said wheel $f^6$ is provided with an indicating pointer or hand $f^9$, adapted to pass over the suitable scale-plate $f^{10}$, mounted above the wheel $f^6$. A coiled spring $f^{11}$ surrounds the shaft of the wheel $f^6$ and is connected to the arm $f^7$, so that the said wheel $f^6$ when released from the spur $f^5$ after being rotated will return to its normal position with the indicating-arm $f^9$ pointing to zero upon the scale $f^{10}$. By this means the indicating device may be set at zero after each bolt has been measured, and thus obviate the necessity of subtracting two results indicated upon the scale one from the other, the arm $f^9$ indicating the exact amount of each sale. The cloth is caused to pass between the said measuring-rollers by the winding-roller E. This roller E is provided at each end with a trunnion or journal $e$. One of said trunnions is mounted in the socketed end $e'$ of the adjustable rod $e^2$, which in turn is mounted in a metallic sleeve $e^3$, secured in one of the standards $b^2$. The said rod $e^2$ is adjustably mounted in a sleeve $e^3$, a set-screw $e^4$ passing through said sleeve outside of the standard $b^2$ and engaging said rod. The journal $e$ upon the opposite end of the roller E is provided with a knuckle-joint $e^5$, and has its outer end rigidly mounted in a socketed rod $e^6$ by set-screws $e^7$. The outer end of said rod $e^7$ is provided with a spur-gear $e^8$, which meshes with a large gear-wheel $e^9$, journaled upon the standard $b^2$. Said gear-wheel $e^9$ is provided with a crank-handle $e^{10}$, whereby said roller E may be operated to draw the material being measured through the roller E. For rebolting purposes we provide the upper end of the standard $b^2$ with a suitable journaled winding board or slot H, adapted to clamp the board ordinarily employed for bolting cloth between said standards, so that the cloth may be removed from said board and wound upon a roller below.

By the employment of our invention the goods are fully protected from dust or from excessive light to fade them and at the same time are always ready for examination or sale by simply unwinding them from the respective rollers upon which they are mounted and passing them through the measuring-rollers upon the auxiliary frame. When a sale is to be made, the goods are first passed between the rollers D and then wound upon the roller E until the desired quantity is indicated upon the scale-disk $f^{10}$. The roller E is then removed by slipping the adjustable rod $e^2$ longitudinally out of engagement with the journaled end $e$ and the cloth slid from said roller to be wrapped. By our improved measuring attachment the goods may be reeled off and measured much more readily than by the employment of the yard-stick and at the same time wound in a very compact form ready for wrapping.

Having thus described our invention, what we claim as new, and desire to secure by Letters Patent, is—

1. In a cloth-holding apparatus, the combination with a main frame, of brackets mounted thereon and each provided with a journal-engaging wing adapted to turn up or down at will, spring-rollers having angular journal ends mounted in said brackets, and adapted to be engaged by said wings to cause the winding of the springs, or disengaged from the same to permit the free rotation of the rollers, substantially as described.

2. In a cloth-holding apparatus, the combination with a supporting-frame, of journal-brackets mounted thereon, pivot-rods having journal-engaging wings mounted in said brackets, spring-rollers having angular journal ends also mounted in said brackets, and pivot-rods having journal-engaging wings mounted on the ends of said rollers; the construction and operation being such that the pivoted rods may turn to permit the rollers to rotate freely in the supporting-brackets, or to rotate against the tension of the springs therein, substantially as described.

3. In a cloth-holding apparatus, the combination with a supporting-frame, of journal-brackets mounted thereon, spring-rollers having angular journal ends mounted in said brackets, pivot-rods having journal-engaging wings lying on the ends of said rollers, and means mounted upon the brackets and adapted to engage the angular journal ends of the rollers or be disengaged therefrom at will, substantially as described.

4. In a cloth measuring and bolting apparatus, the combination with a suitable main frame, of cloth-holding rollers mounted thereon, an auxiliary frame mounted on the main frame, measuring-rollers mounted on said auxiliary frame, measuring-gearing connected to said rollers, a movable index-carrying gear, means for throwing the same into or out of mesh with the measuring-gears, and a spring for returning said movable gear to its original position when disengaged from the measuring-gears, substantially as described.

In testimony whereof we have signed this specification in the presence of two subscribing witnesses.

THOMAS F. APPERSON.
CHARLES H. DORSEY.

Witnesses:
H. V. MUSE,
J. A. AKIN.